US008417127B2

(12) United States Patent
Hayashi

(10) Patent No.: US 8,417,127 B2
(45) Date of Patent: Apr. 9, 2013

(54) INFRARED COMMUNICATIONS RECEIVER

(75) Inventor: Keiji Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/452,753

(22) PCT Filed: Jun. 12, 2008

(86) PCT No.: PCT/JP2008/060757
§ 371 (c)(1),
(2), (4) Date: Jan. 21, 2010

(87) PCT Pub. No.: WO2009/034756
PCT Pub. Date: Mar. 19, 2009

(65) Prior Publication Data
US 2010/0119242 A1 May 13, 2010

(30) Foreign Application Priority Data

Sep. 12, 2007 (JP) ................................. 2007-236539

(51) Int. Cl.
*H04B 10/06* (2006.01)
(52) U.S. Cl. .......................... 398/205; 398/107; 398/115
(58) Field of Classification Search .......... 398/106–107, 398/115–117, 183–191, 205–212
See application file for complete search history.

(56) References Cited

U.S. PATENT DOCUMENTS

| 6,528,782 | B1 * | 3/2003 | Zhang et al. | 250/226 |
| 2004/0239923 | A1 * | 12/2004 | Adams et al. | 356/317 |
| 2006/0024037 | A1 | 2/2006 | Tsutsumi et al. | |
| 2006/0176917 | A1 * | 8/2006 | Grek et al. | 372/29.02 |
| 2007/0268236 | A1 * | 11/2007 | Morrow | 345/102 |
| 2009/0214225 | A1 * | 8/2009 | Nakagawa et al. | 398/191 |

FOREIGN PATENT DOCUMENTS

| JP | 57-191152 | 11/1982 |
| JP | 57-191153 | 11/1982 |
| JP | 05-260573 | 10/1993 |
| JP | 2001-251204 | 9/2001 |
| JP | 2003-110437 | 4/2003 |
| JP | 2006-41657 | 2/2006 |
| JP | 2006-352394 | 12/2006 |

* cited by examiner

*Primary Examiner* — Dzung Tran
(74) *Attorney, Agent, or Firm* — Harness, Dickey & Pierce

(57) ABSTRACT

An objective of one embodiment of the present invention is to reduce abrupt noise derived from infrared light emitted by a light source from a data signal of infrared light received by an infrared communications receiver for use with a display device including a light source without reducing the strength of the data signal. A multiplication factor for the amplitude of abrupt noise outputted by a lamp light-receiving element disposed in the vicinity of lamps of a liquid crystal television is adjusted in order for the amplitude of abrupt noise derived from the lamps and outputted by the lamp light-receiving element to be equalized with the amplitude of abrupt noise derived from the lamps and included in a data signal outputted by a data light-receiving element. Then, the abrupt noise subjected to multiplication factor adjustment is subtracted from the data signal including the abrupt noise, so that only the data signal remains and is transmitted to the liquid crystal television.

5 Claims, 11 Drawing Sheets

FIG. 7

| LAMP DRIVE | THRESHOLD FOR FREQUENCY FILTER PORTION | | GAIN FOR AMPLIFICATION PORTION | |
|---|---|---|---|---|
| CONTINUOUS DRIVE | LOW | $\alpha 0$ | LOW | $\alpha 0$ |
| PWM DRIVE | MED ↓ HIGH | $\alpha 1$<br>$\alpha 2$<br>$\alpha 3$<br>•<br>•<br>•<br>$\alpha n$ | MED ↓ HIGH | $\beta 1$<br>$\beta 2$<br>$\beta 3$<br>•<br>•<br>•<br>$\beta 4$ |

FIG. 10

| LAMP DRIVE | THRESHOLD FOR FREQUENCY FILTER PORTION | | GAIN FOR AMPLIFICATION PORTION | |
|---|---|---|---|---|
| CONTINUOUS DRIVE | LOW | $\alpha 0$ | LOW | $\alpha 0$ |
| PWM DRIVE | MED / LARGE | $\alpha k$ | MED / HIGH | $\beta k$ |

INFRARED COMMUNICATIONS RECEIVER

TECHNICAL FIELD

The present invention relates to infrared communications receivers, and particularly to an infrared communications receiver for use with a display device including a light source.

BACKGROUND ART

In recent years, high-speed infrared communications, such as IrSS (one-way communications function (Home Appliance Profile) that conforms with IrSimple 1.0 standards), have come into use for transmitting image data for pictures taken by cell phones, digital cameras, etc., to display devices, such as liquid crystal televisions, thereby displaying the pictures, or transmitting and storing such image data to, for example, hard disk recorders. Infrared output power for use in such infrared communications is lower than that from remote controls for controlling electronic equipment.

On the other hand, emission-line peaks for argon (Ar) and mercury (Hg) gases enclosed in cold cathode fluorescent lamps (CCFLs) (hereinafter, referred to as "lamps") for use as backlights in liquid crystal televisions correspond to rays of near-infrared light having a wavelength of 900 nm to 950 nm. In some cases, such near-infrared light leaks outside the liquid crystal television, and enters a light-receiving portion of an infrared communications receiver included in the liquid crystal television after being reflected by a viewer or a peripheral object.

In the case where a plurality of lamps are driven by continuous drive, the lighting frequency of the lamps is 1 MHz, and therefore the frequency of near-infrared light emitted by the lamps is also approximately 1 MHz. However, rays of near-infrared light emitted by the lamps differ in phase, and therefore overlap with one another so that their optical strengths do not change substantially. When the near-infrared light with a substantially unchanging optical strength enters the light-receiving portion of the receiver simultaneously with infrared light for use in infrared communications, the near-infrared light turns into continued noise with a substantially unchanging strength (hereinafter, referred to as "continuous noise"). However, when processing a data signal containing continuous noise, a frequency filter portion in the receiver can reduce the continuous noise to a sufficiently low level. Therefore, the continuous noise does not prevent reception of the data signal.

On the other hand, when the lamps are driven by PWM (Pulse Width Modulation) drive, for example, as in the case where backlights are driven by dimming drive, an oscillator for generating a lighting frequency of 1 MHz for the lamps is required to be turned ON/OFF at a frequency of, for example, 100 kHz. In such a case, a phenomenon is known to occur where not only near-infrared light is generated when the oscillator is turned ON but also near-infrared light with an abruptly changing optical strength is generated about once every ten times when the oscillator is switched from OFF to ON. The near-infrared light with an abruptly changing optical strength has a frequency of about 10 kHz and a pulse width corresponding to a frequency of 1 MHz.

The near-infrared light enters the light-receiving portion of the receiver simultaneously with the infrared light for use in infrared communications, and turns into noise (hereinafter, referred to as "abrupt noise") including pulses with abruptly changing strengths. On the other hand, the near-infrared light that is emitted when the lamps are being driven at 1 MHz turn into noise (hereinafter, referred to as "non-abrupt noise") including no abruptly changing pulses even when the near-infrared light enters the light-receiving portion. Unlike the non-abrupt noise, the abrupt noise is difficult to reduce to a sufficiently low level using the frequency filter portion.

Therefore, conventionally, in order to prevent entry of near-infrared light from lamps that has an abruptly changing optical strength into the light-receiving portion of the receiver, optical filters for absorbing near-infrared light are affixed around the lamps.

Also, Patent Document 1 discloses a receiver including a reception status determination portion which, upon reception of a data signal transmitted from a remote control, determines whether the reception of the data signal is good or not, and when the reception is poor, controls a dimmer portion to cancel PWM drive.

Patent Document 2 discloses an optical receiver in which a light-receiving portion provided therein has an optical filter attached thereto such that, when the light-receiving portion receives an infrared signal transmitted from a remote control, near-infrared light emitted by a display device is unlikely to enter the light-receiving portion after being reflected by clothes of a viewer or a peripheral object.

[Patent Document 1] Japanese Laid-Open Patent Publication No. 2006-352394

[Patent Document 2] Japanese Laid-Open Patent Publication No. 2006-41657

DISCLOSURE OF THE INVENTION

Problems to be Solved by the Invention

However, when the optical filters are affixed around the lamps, not only near-infrared light, which turns into noise, is absorbed but also red visible light close to the near-infrared light is absorbed to some extent, resulting in a dark screen on the liquid crystal television.

Also, as for the receiver disclosed in Patent Document 1, when the reception is determined to be poor, an oscillating portion, which is a noise generation source, is stopped from operating, thereby canceling a dimmed mode, but abrupt noise derived from infrared light emitted by the light source of the display device cannot be reduced without lowering the strength of the data signal.

As for the optical receiver disclosed in Patent Document 2, the optical filter is affixed to the light-receiving portion in order to make it difficult for infrared light emitted by the display device to enter the light-receiving portion, and therefore abrupt noise derived from infrared light emitted by the light source of the display device cannot be reduced without lowering the strength of the data signal.

Therefore, an objective of the present invention is to provide an infrared communications receiver for use with a display device including a light source, in which abrupt noise derived from infrared light emitted by the light source can be reduced from a data signal of infrared light received by the receiver without lowering the strength of the data signal.

Solution to the Problems

A first aspect of the present invention is directed to an infrared communications receiver for use with a display device including a light source, the receiver including:

a first light-receiving element for receiving an externally transmitted infrared signal and outputting a first signal;

a second light-receiving element disposed in the vicinity of the light source for at least receiving infrared light or visible light emitted by the light source and outputting a second signal; and a reduction portion for reducing a noise component in the first signal based on the second signal, the noise component being derived from the infrared light emitted by the light source.

In a second aspect of the present invention, based on the first aspect of the invention, the reduction portion includes:

a first information generation portion for generating first strength information about an amplitude of the first signal outputted by the first light-receiving element;

a first adjustment portion for adjusting an amplitude of the second signal to be equal to the amplitude of the first signal based on the first strength information; and a first subtraction portion for subtracting the second signal with the amplitude adjusted by the first adjustment portion from the first signal.

In a third aspect of the present invention, based on the first aspect of the invention, the reduction portion includes:

a second information generation portion for generating second strength information about an amplitude of the second signal;

a second adjustment portion for adjusting an amplitude of the noise component included in the first signal outputted by the first light-receiving element to be equal to the amplitude of the second signal based on the second strength information; and a second subtraction portion for subtracting the second signal from the first signal including the noise component with the amplitude adjusted by the second adjustment portion.

In a fourth aspect of the present invention, based on the second or third aspect of the invention, the reduction portion further includes:

a frequency filter portion for reducing a non-abrupt noise element in the noise component included in the first signal outputted by the first light-receiving element before subtracting the second signal from the first signal; and an amplification portion for amplifying the first signal after the subtraction of the second signal.

In a fifth aspect of the present invention, based on the first aspect of the invention, the reduction portion includes:

a frequency filter portion for reducing the noise component;

a determination portion for receiving a drive control signal including control information for driving the light source, and determining whether or not the light source is being driven by pulse width modulation drive based on the drive control signal; and a control portion for setting a threshold for the frequency filter portion when the light source is determined as being driven by pulse width modulation drive by the determination portion, and when the light source is determined as being driven by pulse width modulation drive by the determination portion, the frequency filter portion reduces an abrupt noise element in a data signal based on the threshold being set, the abrupt noise element being derived from the infrared light emitted by the light source.

In a sixth aspect of the present invention, based on the fifth aspect of the invention, the reduction portion further includes a detection portion for detecting an occurrence frequency by counting the number of times the abrupt noise element is outputted by the frequency filter portion, and the control portion changes the threshold upon determination that the first signal is unreceivable based on the occurrence frequency for the counted abrupt noise elements.

In a seventh aspect of the present invention, based on the fifth aspect of the invention, the reduction portion further includes an amplification portion for amplifying the first signal with the reduced abrupt and non-abrupt noise elements, the control portion sets a gain corresponding to the threshold for the amplification portion, and the amplification portion amplifies the first signal based on the gain being set.

In an eighth aspect of the present invention, based on the seventh aspect of the invention, the control portion further contains data for a plurality of preset combinations of the threshold and the gain, and the control portion selects one of the combinations in the data based on an occurrence frequency for the noise component, and sets the selected threshold for the frequency filter portion and the selected gain for the amplification portion.

In a ninth aspect of the present invention, based on the fifth aspect of the invention, the second light-receiving element has applied on its surface a substance for converting at least a portion of the second signal into a direct-current signal.

Effect of the Invention

According to the first aspect of the invention, the infrared communications receiver has the second light-receiving element disposed in the vicinity of the light source of the display device, thereby reducing a noise component, which is derived from infrared light emitted by the light source, from within the first signal based on the second signal, and outputting the first signal with the reduced noise component based on an externally transmitted infrared signal. Thus, the receiver can reduce the noise component, which is derived from infrared light emitted by the light source, from the first signal without reducing the strength of the first signal.

According to the second aspect of the invention, the reduction portion adjusts the amplitude of the second signal to be equal to the amplitude of the first signal based on the strength information about the amplitude of the first signal, and then subtracts the adjusted second signal from the first signal. In this case, the reduction portion can reduce the second signal included in the first signal by adjusting the amplitude of the second signal.

According to the third aspect of the invention, the reduction portion adjusts the amplitude of the first signal to be equal to the amplitude of the second signal based on the strength information about the amplitude of the second signal, and then subtracts the second signal from the first signal. In this case, the reduction portion can reduce the second signal included in the first signal by adjusting the amplitude of the first signal.

According to the fourth aspect of the invention, the reduction portion reduces the non-abrupt noise element included in the first signal through the frequency filter portion before subtracting the second signal from the first signal. Then, the first signal from which the second signal has been subtracted is amplified by the amplification portion. In this case, the second signal is subtracted from the first signal after reducing the non-abrupt noise element, and therefore the noise component can be more effectively reduced. Also, the reduction portion includes the amplification portion for amplifying the first signal, and therefore the amplitude of the first signal that has been reduced by the frequency filter portion reducing the non-abrupt noise element can be recovered.

According to the fifth aspect of the invention, the determination portion receives a drive setting signal including control information for driving the light source, and determines whether or not the light source is being driven by pulse width modulation drive based on the received drive information signal. When the determination by the determination portion indicates pulse width modulation drive, the control portion sets a threshold for the frequency filter portion. The frequency filter portion reduces an abrupt noise element, which is derived from infrared light from the light source being driven by pulse width modulation drive, from a data signal based on the threshold set by the control portion. Thus, the infrared communications receiver can minimize an abrupt noise element included in a data signal when the light source of the display device is being driven by pulse width modulation drive.

According to the sixth aspect of the invention, an occurrence frequency is detected by counting the number of occurrences of the abrupt noise element, and the control portion determines whether or not the first signal is receivable based on the detected occurrence frequency. As a result, when the signal is determined to be not receivable, the control portion changes the current threshold being set for the frequency filter portion. In this case, the frequency response of the frequency filter portion changes, and therefore the abrupt noise element included in the first signal is reduced.

According to the seventh aspect of the invention, the first signal is amplified by the amplification portion with a gain corresponding to the threshold being set for the frequency filter portion. Thus, the amplitude of the first signal that has been reduced by the processing through the frequency filter portion is recovered.

According to the eighth aspect of the invention, the control portion has preset data for a plurality of combinations of threshold for the frequency filter portion and gain for the amplification portion. In this case, it is only necessary to select any one of the combinations in the data, and therefore the threshold and the gain can be readily set.

According to the ninth aspect of the invention, at least a portion of the waveform of the second signal is converted into a direct-current signal, and therefore the control portion can readily determine whether or not the light source of the display device is being driven by PWM drive.

BRIEF DESCRIPTION OF THE DRAWINGS

FIG. 7 is a diagram illustrating combinations of threshold for a frequency filter portion and gain for an amplification portion in the embodiment for both cases where lamps are being driven by continuous drive and where they are being driven by PWM drive.

FIG. 10 is a diagram illustrating combinations of threshold for a frequency filter portion and gain for an amplification portion in the variant of the embodiment for both cases where lamps are being driven by continuous drive and where they are being driven by PWM drive.

Figure 1:
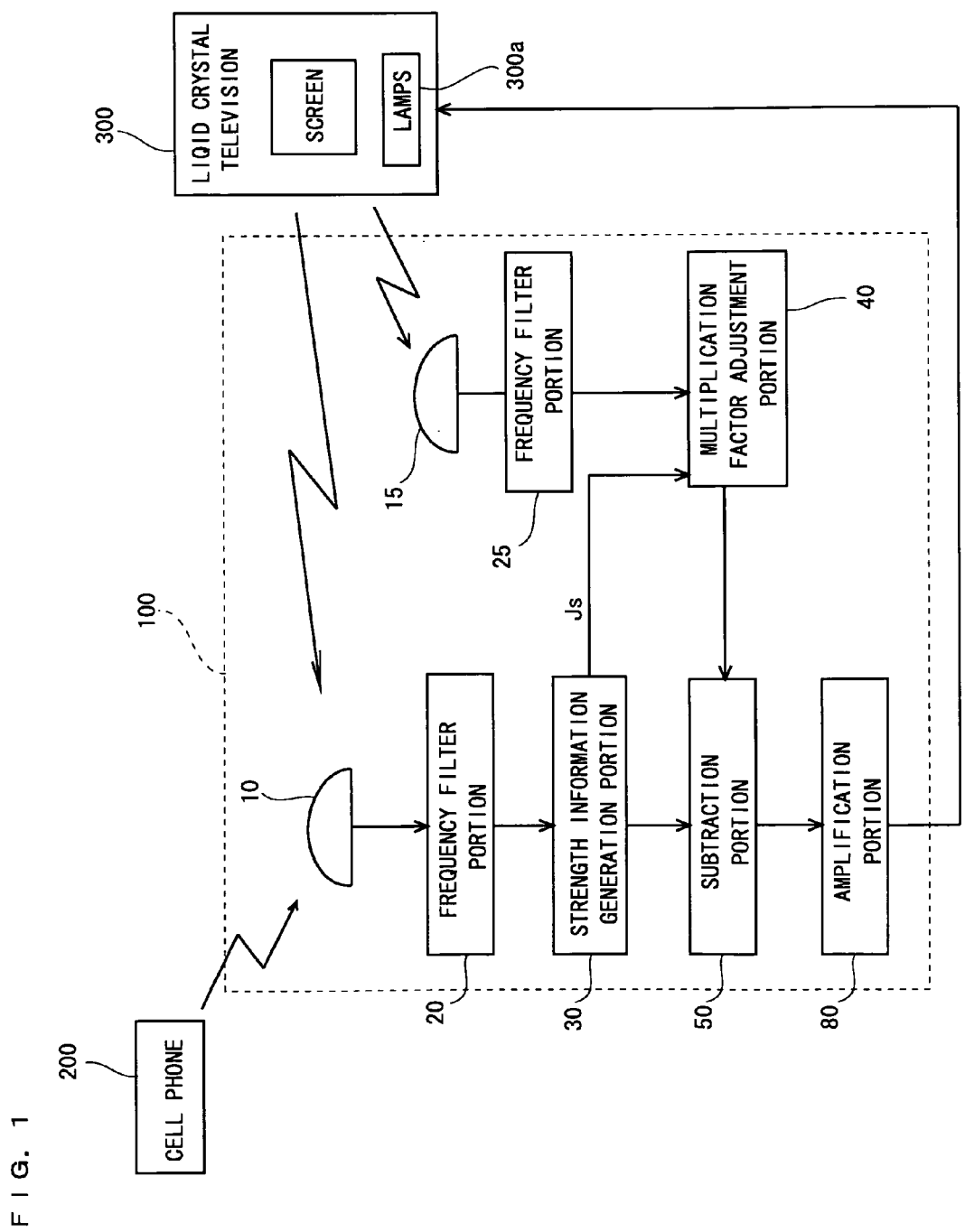
FIG. 1 is a block diagram illustrating the overall configuration of a reception system including an infrared communications receiver according to a first embodiment of the present invention.

DESCRIPTION OF THE REFERENCE CHARACTERS 10 data light-receiving element
15 lamp light-receiving element
20, 25 frequency filter portion
30, 35 strength information generation portion
40, 45 multiplication factor adjustment portion
50 subtraction portion
60 waveform analysis portion
70 control portion
70a register
80 amplification portion
100, 110, 120, 130, 140, 150 infrared communications receiver
Js abrupt noise strength information
Jf abrupt noise occurrence frequency

BEST MODE FOR CARRYING OUT THE INVENTION

Hereinafter, embodiments of an infrared communications receiver according to the present invention will be described in detail with reference to the drawings.

1. First Embodiment 1.1 Overall Configuration and Operation

FIG. 1 is a block diagram illustrating the overall configuration of a reception system including an infrared communications receiver 100 according to a first embodiment of the present invention. In the reception system, image data for a picture taken by a cell phone 200 is transmitted to the receiver 100 via IrSS in high-speed infrared communications, and the receiver 100 outputs the received image data to a liquid crystal television 300, thereby displaying the picture taken by the cell phone 200 on the liquid crystal television 300.

Figure 2:
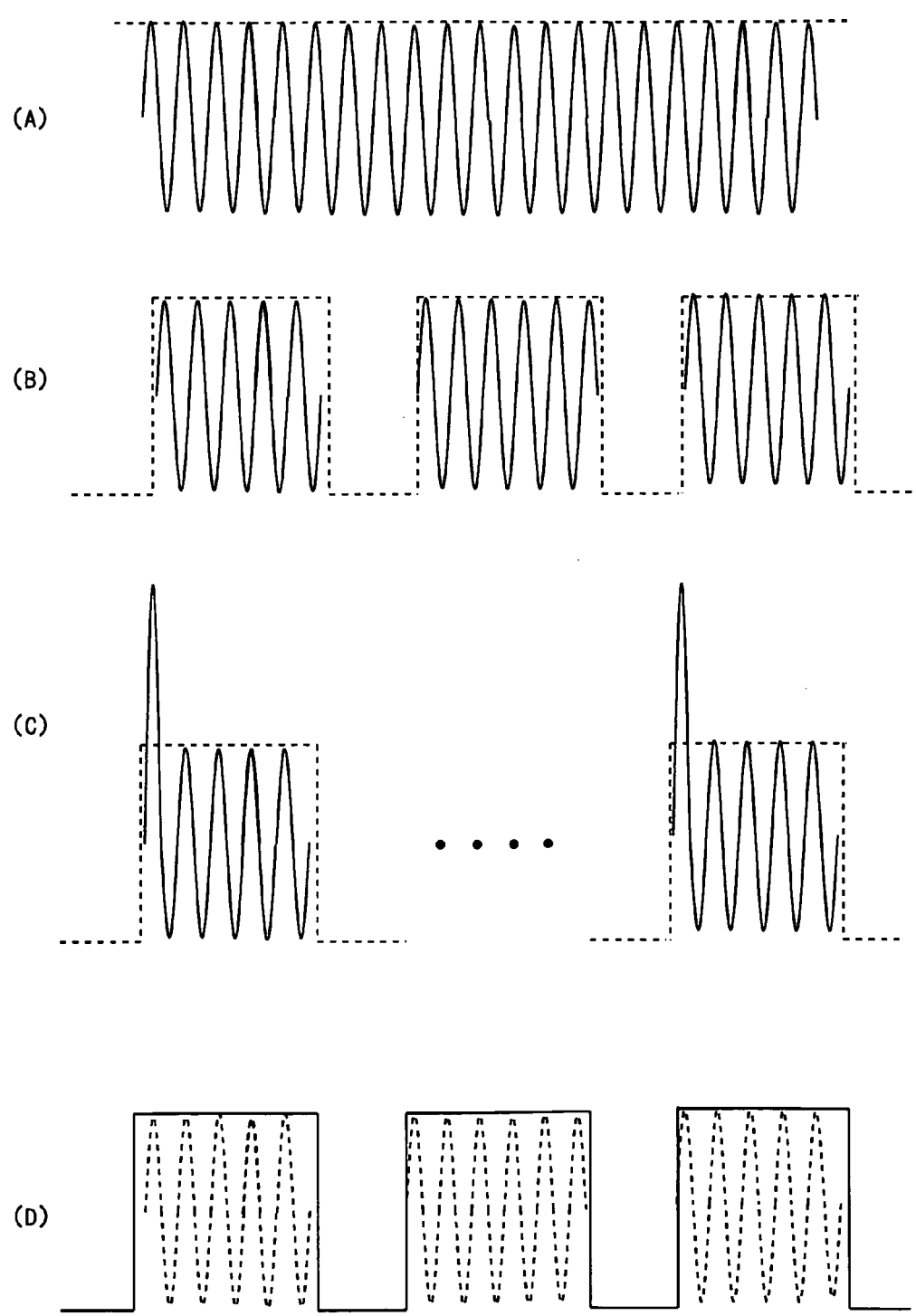
FIG. 2 is a diagram illustrating waveforms of alternating-current voltages for driving lamps included in a liquid crystal television as backlights.

Also, FIG. 2 is a diagram illustrating waveforms of alternating-current voltages for driving lamps 300a included in the liquid crystal television 300 as backlights.

As shown in FIG. 1, the receiver 100 includes a section for processing a data signal from the cell phone 200, and a section for processing noise from the lamps 300a of the liquid crystal television 300. The data signal processing section includes a data light-receiving element 10, a frequency filter portion 20, a strength information generation portion 30, a subtraction portion 50, and an amplification portion 80, while the noise processing section includes a lamp light-receiving element 15, a frequency filter portion 25, and a multiplication factor adjustment portion 40.

The cell phone 200 converts the image data for the taken picture into infrared light modulated at a frequency of 40 kHz (hereinafter, abbreviated as a "40-kHz infrared light"), and transmits the light to the data light-receiving element 10 of the receiver 100 via IrSS.

The liquid crystal television 300 includes a plurality of lamps 300a as backlights. The lamps 300a emit not only rays of white light for irradiating a liquid crystal panel but also rays of near-infrared light having a wavelength of 900 nm to 950 nm, which correspond to emission-line peaks of enclosed argon (Ar) and mercury (Hg) gases.

The lamps 300a are driven either by continuous drive in which 1-MHz frequency alternating-current voltages are applied for lighting up the lamps 300a, as shown in FIG. 2(A), or by PWM drive in which the 1-MHz frequency alternating-current voltages are further repeatedly turned ON/OFF at 100 kHz for lighting up the lamps 300a, as shown in FIG. 2(B).

First, the case where the lamps 300a are driven by continuous drive will be described. As shown in FIG. 2(A), when a 1-MHz alternating-current voltage is applied to each of the lamps 300a for lighting up, the lamps 300a emit rays of near-infrared light with their optical strengths changing at 1 MHz, which is approximately equal to the lighting frequency. However, the alternating-current voltages for driving the lamps 300a differ in phase, and therefore the rays of near-infrared light emitted by the lamps 300a also differ in phase. Accordingly, the rays of near-infrared light emitted by the lamps 300a overlap with one another, and change little in optical strength. Such light turns into continuous noise after entering the data light-receiving element 10.

Next, the case where the lamps 300a are driven by PWM drive will be described. As shown in FIG. 2(B), the lamps 300a are driven by alternating-current voltages generated by further turning the 1-MHz frequency alternating-current oscillator ON/OFF at 100 kHz. In this case, the lamps 300a are simultaneously turned ON/OFF. When the 1-MHz frequency alternating-current oscillator is switched from OFF to ON, i.e., when a square wave, which is represented by dotted lines outlining the waveform of the 1-MHz frequency alternating-current voltage as shown in FIG. 2(C), rises, a pulse of near-infrared light with a width corresponding to a 1-MHz frequency and an abruptly changing strength is generated about once every ten times, i.e., at a 10-kHz pulse recurrence frequency (hereinafter, referred to as a "frequency"). In addition, when the 1-MHz frequency alternating-current voltages are applied to the lamps 300a, the lamps 300a also emit near-infrared light with substantially unchanging optical strengths as in the case where the lamps are driven by continuous drive.

The lamp light-receiving element 15 is disposed in the vicinity of the lamps 300a of the liquid crystal television 300 so as to be capable of receiving near-infrared light emitted by the lamps 300a. Accordingly, when the lamps 300a are being driven by PWM drive, pulses of near-infrared light with an abruptly changing optical strength, along with near-infrared light with a substantially unchanging optical strength, enter the lamp light-receiving element 15 disposed in the vicinity of the lamps 300a. However, the near-infrared light not only enters the lamp light-receiving element 15 but also leaks outside the liquid crystal television 300, so that the near-infrared light is reflected by an ambient viewer or object and enters the data light-receiving element 10, which is intended to receive an infrared signal from the cell phone 200. Note that in order not to receive visible light, the data light-receiving element 10 is provided with an optical filter (not shown) for simply passing infrared light therethrough. However, in some cases, the lamp light-receiving element 15 is not provided with such an optical filter in order to minimize production cost. Accordingly, the case where the lamp light-receiving element 15 is provided with an optical filter will be described first, and then the case where no optical filter is provided will be described later.

The data light-receiving element 10 receives 40-kHz infrared light transmitted from the cell phone 200, and converts the light into a data signal. At this time, near-infrared light with a substantially unchanging optical strength and near-infrared light with an abruptly changing optical strength, which are both emitted by the lamps 300a, also enter the data light-receiving element 10, and turn into non-abrupt noise and abrupt noise, respectively, which are outputted to the frequency filter portion 20 along with the data signal. On the other hand, the lamp light-receiving element 15 also receives near-infrared light with a substantially unchanging optical strength and near-infrared light with an abruptly changing optical strength from the lamps 300a, and then outputs them to the frequency filter portion 25 after conversion into signals which turn into non-abrupt noise and abrupt noise, respectively.

The frequency filter portion 20 is a bandpass filter with its center frequency being set at 40 kHz in order to pass 40-kHz data signals therethrough. The frequency filter portion 20 has a frequency response such that the maximum gain is obtained at the center frequency and signals pass therethrough without lowering their levels. Also, as the frequency increases/decreases from the center frequency, the gain trails off at the low end of the spectrum, and therefore the level of the signals processed by the frequency filter portion 20 also decreases accordingly. Furthermore, as for any frequencies sufficiently higher or lower than the center frequency, the gain is reduced to zero, so that signals are completely cut off.

The trailing off of the frequency response is determined by a threshold (cutoff frequency) being set for the frequency filter portion 20 such that the frequency response more gradually trails off to zero as the threshold decreases, and therefore a signal to be processed is not completely cut off and passes through even if the frequency of the signal is significantly higher or lower than the center frequency. Conversely, as the threshold increases, the gain is more sharply reduced to zero, and therefore the signal to be processed is completely cut off even if the frequency of the signal is close to the center frequency. In this manner, the threshold is a variable for simply changing the frequency of signals to be cut off without changing the gain at the center frequency, and as the value increases, signals at frequencies close to the center frequency are more likely to be cut off.

Accordingly, when a data signal including non-abrupt noise and abrupt noise is processed by the frequency filter portion 20, the non-abrupt noise is reduced to a sufficiently low level. However, the abrupt noise passes through the frequency filter portion 20 about once every one thousand to ten thousand times, i.e., 10-kHz frequency abrupt noise passes as abrupt noise of approximately 1 Hz to 10 Hz. In such a case, the data signal, along with the abrupt noise included therein, is outputted to the subsequent strength information generation portion 30.

Furthermore, the frequency filter portion 25 is also a bandpass filter having the same center frequency and threshold as those of the frequency filter portion 20, and therefore is capable of substantially reducing the non-abrupt noise. However, the abrupt noise passes through the frequency filter portion 25 about once every one thousand to ten thousand times. After passing through the frequency filter portion 25, the abrupt noise is outputted to the subsequent multiplication factor adjustment portion 40.

The strength information generation portion 30 measures the amplitude of the abrupt noise included in the data signal that has passed through the frequency filter portion 20, provides the measured amplitude to the multiplication factor adjustment portion 40 as strength information Js, and outputs the data signal including the abrupt noise to the subtraction portion 50.

On the other hand, the multiplication factor adjustment portion 40 adjusts the amplitude of the abrupt noise provided by the frequency filter portion 25 to be approximately equal to the amplitude of the abrupt noise that has passed through the frequency filter portion 20 based on the strength information Js provided by the strength information generation portion 30, and outputs the adjusted abrupt noise to the subtraction portion 50. Note that in the case where the lamp light-receiving element 15 is provided with no optical filter for cutting off visible light, not only the noise in the near-infrared light but also the noise in the visible light enter the lamp light-receiving element 15, so that the frequency filter portion 25 outputs the abrupt noise in the visible light superimposed on the abrupt noise in the near-infrared light. In this case, the multiplication factor adjustment portion 40 may adjust the amplitude of the abrupt noise in either the near-infrared light or the visible light, or a combined amplitude of abrupt noise in both in a manner as described above.

The subtraction portion 50 subtracts the abrupt noise provided by the multiplication factor adjustment portion 40 from the data signal, including the abrupt noise, provided by the strength information generation portion 30. As a result, the abrupt noise included in the data signal is cancelled out, so that only the data signal remains. Then, the subtraction portion 50 outputs the remaining data signal to the amplification portion 80.

The amplification portion 80 has a preset gain corresponding to the threshold for the frequency filter portion 20. The amplification portion 80 amplifies the data signal outputted by the subtraction portion 50 in accordance with the preset gain, so that the amplitude of the data signal, which has been reduced at the time of the processing by the frequency filter portion 20, is increased back to the level before the processing by the frequency filter portion 20.

The data signal amplified by the amplification portion 80 is outputted to the liquid crystal television 300, so that the image of the picture taken by the cell phone 200 is displayed on the liquid crystal television 300.

1.2 Effect

The receiver 100 subtracts abrupt noise outputted by the lamp light-receiving element 15 and subjected to multiplication factor adjustment from a data signal, including abrupt noise, outputted by the data light-receiving element 10, thereby canceling out the abrupt noise signal included in the data signal, so that only the data signal remains. Thus, near-infrared light emitted by the lamps 300a of the liquid crystal television 300 or abrupt noise derived from the near-infrared light and the visible light can be readily reduced within the receiver 100 without reducing the strength of the data signal.

1.3 First Variant

Figure 3:
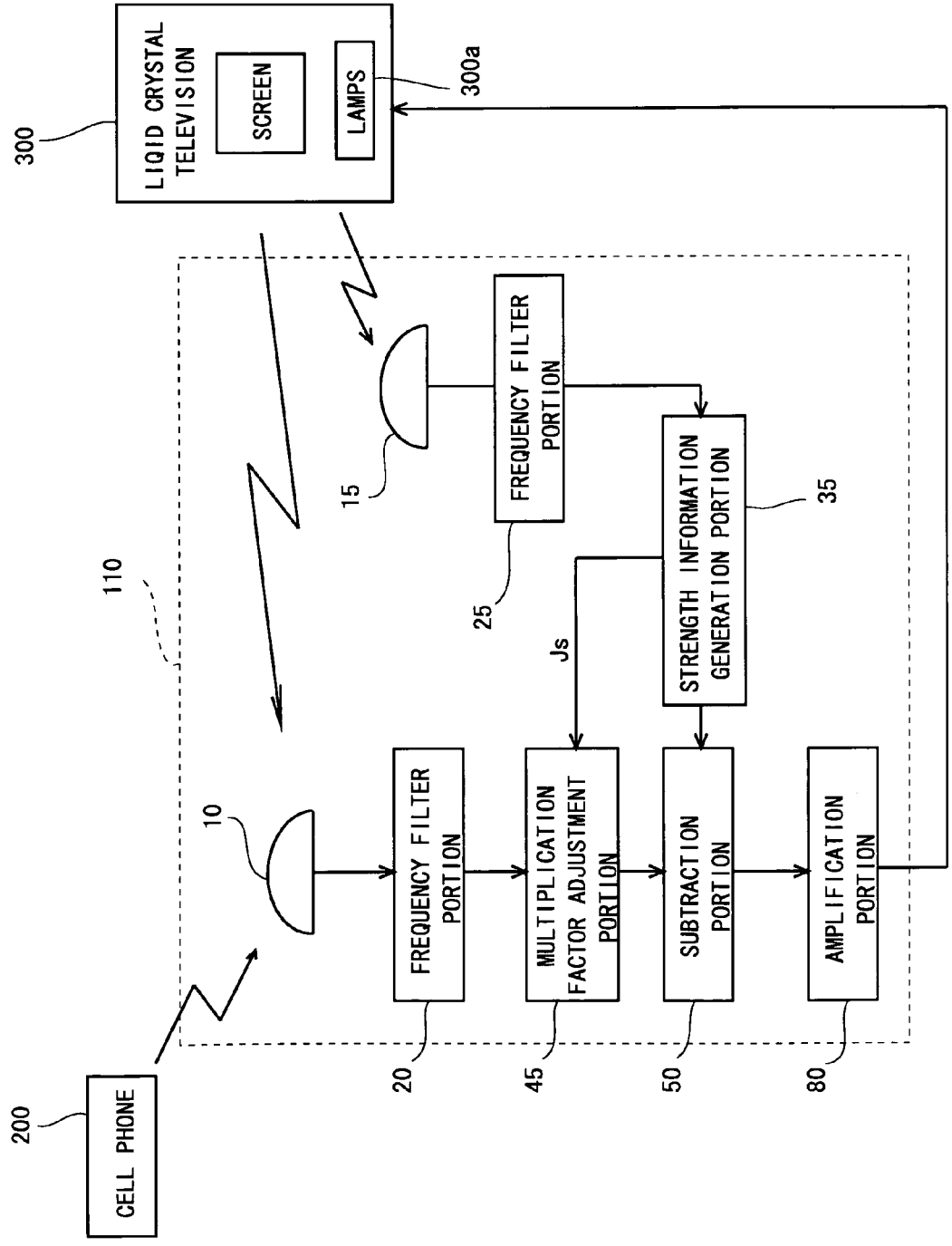
FIG. 3 is a block diagram illustrating the overall configuration of a reception system including an infrared communications receiver according to a first variant of the embodiment.

A first variant of the first embodiment will be described. FIG. 3 is a block diagram illustrating the overall configuration of a reception system including an infrared communications receiver 110 according to the first variant of the first embodiment. In FIG. 3, elements corresponding to those in FIG. 1 are denoted by the same reference characters, and any descriptions thereof will be omitted. Of the elements included in the receiver 100 shown in FIG. 1, the strength information generation portion 30 disposed between the frequency filter portion 20 and the subtraction portion 50, and the multiplication factor adjustment portion 40 disposed between the frequency filter portion 25 and the subtraction portion 50 are replaced by a multiplication factor adjustment portion 45 and a strength information generation portion 35, respectively, in the receiver 110 shown in FIG. 3.

At the time of PWM drive, the frequency filter portion 20 is capable of sufficiently reducing the level of the non-abrupt noise as described above, and also capable of sufficiently reducing the level of the abrupt noise about nine-hundred ninety-nine times out of a thousand to nine-thousand nine-hundred ninety nine times out of ten thousand. That is, along with the data signal, the frequency filter portion 20 also outputs the abrupt noise, which passes once every thousand to ten thousand, to the subsequent multiplication factor adjustment portion 45.

Similarly, at the time of the processing by the frequency filter portion 25, the abrupt noise, which passes once every thousand to ten thousand, is provided to the strength information generation portion 35. The strength information generation portion 35 measures the amplitude of the provided abrupt noise, and provides the measurement result to the multiplication factor adjustment portion 45 as strength information Js, while outputting the abrupt noise to the subtraction portion 50. Note that when the lamp light-receiving element 15 is provided with no optical filter for cutting off visible light, the frequency filter portion 25 outputs the abrupt noise in the visible light superimposed on the abrupt noise in the near-infrared light. In such a case, the strength information generation portion 35 may measure the amplitude of the abrupt noise in either the near-infrared light or the visible light, or a combined amplitude of abrupt noise in both, as the amplitude of the aforementioned abrupt noise.

The multiplication factor adjustment portion 45 adjusts the amplitude of the abrupt noise included in the data signal provided by the frequency filter portion 20 to be equal to the amplitude of the abrupt noise outputted by the lamp light-receiving element 15 based on the strength information Js provided by the strength information generation portion 35, and outputs a data signal including the adjusted abrupt noise to the subtraction portion 50.

The subtraction portion 50 subtracts the abrupt noise provided by the strength information generation portion 35 from the data signal including the abrupt noise subjected to multiplication factor, adjustment, thereby canceling out the abrupt noise included in the data signal, and outputs the data signal having the abrupt noise reduced to a sufficiently low level to the amplification portion 80.

In the first variant, unlike in the first embodiment, the abrupt noise outputted by the lamp light-receiving element 15 is subtracted from the data signal received by the data light-receiving element 10 and including the abrupt noise subjected to multiplication factor adjustment, thereby canceling out the abrupt noise included in the data signal, so that only the data signal remains. As a result, as in the first embodiment, abrupt noise derived from near-infrared light emitted by the lamps 300a of the liquid crystal television 300 can be readily reduced within the receiver 110 without reducing the strength of the data signal.

1.4 Second Variant

Figure 4:
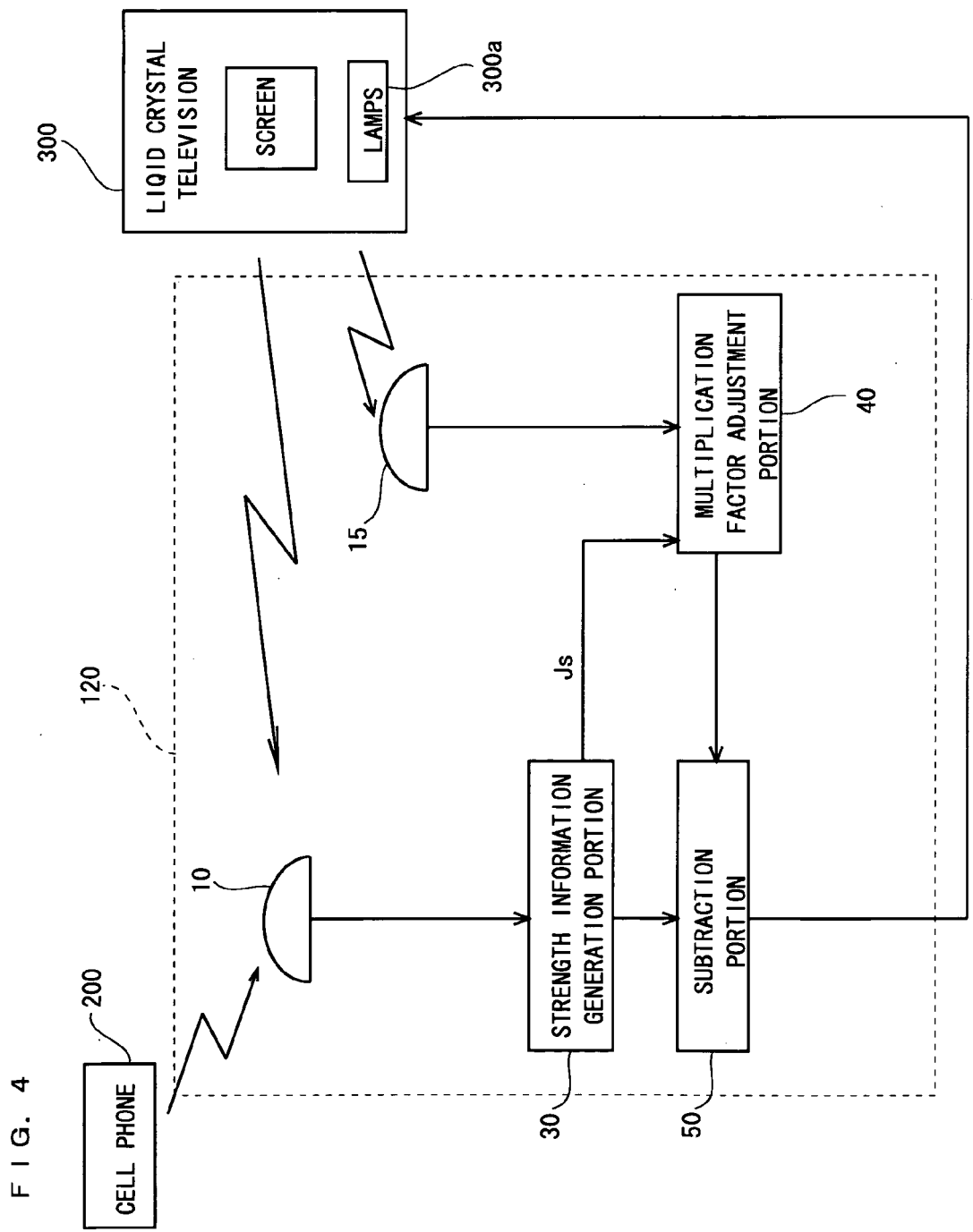
FIG. 4 is a block diagram illustrating the overall configuration of a reception system including an infrared communications receiver according to a second variant of the embodiment.

A second variant of the first embodiment will be described. FIG. 4 is a block diagram illustrating the overall configuration of a reception system including an infrared communications receiver 120 according to the second variant of the first embodiment. In FIG. 4, elements corresponding to those in FIG. 1 are denoted by the same reference characters, and any descriptions thereof will be omitted.

Of the elements included in the receiver 100 shown in FIG. 1, the frequency filter portions 20 and 25 and the amplification portion 80 are not provided in the receiver 120 shown in FIG. 4. Therefore, when the lamps 300a are driven by PWM drive, the data signal, including non-abrupt noise and abrupt noise, outputted by the data light-receiving element 10 is provided to the strength information generation portion 30. The strength information generation portion 30 measures the amplitude of the abrupt noise included in the data signal, and provides the measured amplitude of the abrupt noise to the multiplication factor adjustment portion 40 as strength information Js, while outputting the data signal, including the abrupt noise and the non-abrupt noise, to the subtraction portion 50.

On the other hand, the multiplication factor adjustment portion 40 adjusts the amplitude of the abrupt noise provided by the lamp light-receiving element 15 to be equal to the amplitude of the abrupt noise included in the data signal based on the strength information Js provided by the strength information generation portion 30, and outputs the non-abrupt noise and the adjusted abrupt noise to the subtraction portion 50. Note that when the lamp light-receiving element 15 is provided with no optical filter for cutting off visible light, the lamp light-receiving element 15 outputs the abrupt noise and the non-abrupt noise in the visible light superimposed on the abrupt noise and the non-abrupt noise in the near-infrared light to the multiplication factor adjustment portion 40. In such a case, the multiplication factor adjustment portion 40 may perform the aforementioned adjustment after measuring the amplitude of the abrupt noise in either the near-infrared light or the visible light, or a combined amplitude of abrupt noise in both, as the amplitude of the abrupt noise provided by the lamp light-receiving element 15.

The subtraction portion 50 subtracts the abrupt noise and the non-abrupt noise provided by the multiplication factor adjustment portion 40 from the data signal, including abrupt noise and non-abrupt noise, provided by the strength information generation portion 30. As a result, the abrupt noise and the non-abrupt noise included in the data signal are cancelled out, so that only the data signal remains. Then, the subtraction portion 50 outputs the remaining data signal to the liquid crystal television 300.

In this manner, even when the frequency filter portions 20 and 25 are not provided, the subtraction portion 50 is capable of outputting a data signal with reduced non-abrupt and abrupt noise. In this case, it is not necessary to provide the frequency filter portions 20 and 25 and the amplification portion 80, and therefore the receiver 120 can be configured in a simplified manner and can be produced at low cost.

1.5 Third Variant

Figure 5:
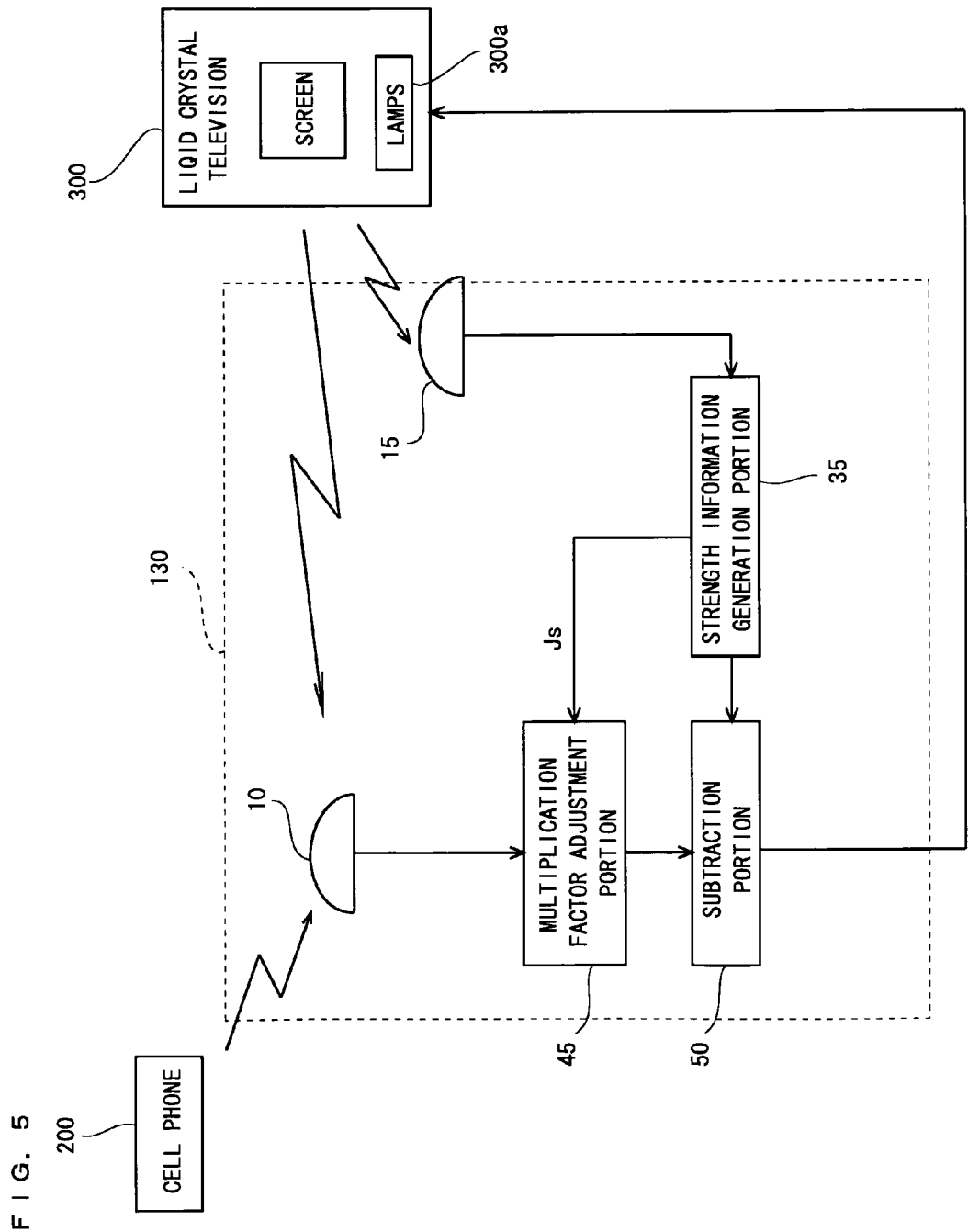
FIG. 5 is a block diagram illustrating the overall configuration of a reception system including an infrared communications receiver according to a third variant of the embodiment.

A third variant of the first embodiment will be described. FIG. 5 is a block diagram illustrating the overall configuration of a reception system including an infrared communications receiver 130 according to the third variant of the first embodiment. The infrared communications receiver 130 in the third variant is a further modification to the first variant shown in FIG. 3. In FIG. 5, elements corresponding to those in FIG. 3 are denoted by the same reference characters, and any descriptions thereof will be omitted.

Of the elements included in the receiver 110 shown in FIG. 3, the frequency filter portions 20 and 25 and the amplification portion 80 are not provided in the receiver 130 shown in FIG. 5. Therefore, the non-abrupt noise and the abrupt noise outputted by the lamp light-receiving element 15 are provided to the strength information generation portion 35. The strength information generation portion 35 measures the amplitude of the provided abrupt noise, and provides the measurement result to the multiplication factor adjustment portion 45 as strength information Js, while outputting the abrupt noise and the non-abrupt noise to the subtraction portion 50. Note that when the lamp light-receiving element 15 is provided with no optical filter for cutting off visible light, the lamp light-receiving element 15 outputs the abrupt noise and the non-abrupt noise in the near-infrared light superimposed on the abrupt noise and the non-abrupt noise in the visible light to the strength information generation portion 35. In such a case, the strength information generation portion 35 may measure the amplitude of the abrupt noise in either the near-infrared light or the visible light, or a combined amplitude of abrupt noise in both, as the amplitude of the abrupt noise provided by the lamp light-receiving element 15.

On the other hand, the data signal, including the abrupt noise and the non-abrupt noise, outputted by the data light-receiving element 10 is provided to the multiplication factor adjustment portion 45. The multiplication factor adjustment portion 45 adjusts the amplitude of the abrupt noise included in the data signal provided by the data light-receiving element 10 to be equal to the amplitude of the abrupt noise outputted by the lamp light-receiving element 15 based on the strength information Js provided by the strength information generation portion 35, and outputs a data signal including the non-abrupt noise and the amplitude-adjusted abrupt noise to the subtraction portion 50.

The subtraction portion 50 subtracts the abrupt noise and the non-abrupt noise provided by the strength information generation portion 35 from the data signal, including the abrupt noise and the non-abrupt noise, outputted by the multiplication factor adjustment portion 45. As a result, the abrupt noise and the non-abrupt noise included in the data signal are cancelled out, so that only the data signal remains. Then, the subtraction portion 50 outputs the remaining data signal to the liquid crystal television 300.

In this case also, it is not necessary to provide the frequency filter portions 20 and 25 and the amplification portion 80, and therefore the receiver 130 can be configured in a simplified manner and can be produced at low cost.

2. Second Embodiment 2.1 Configuration and Operation of the Receiver

Figure 6:
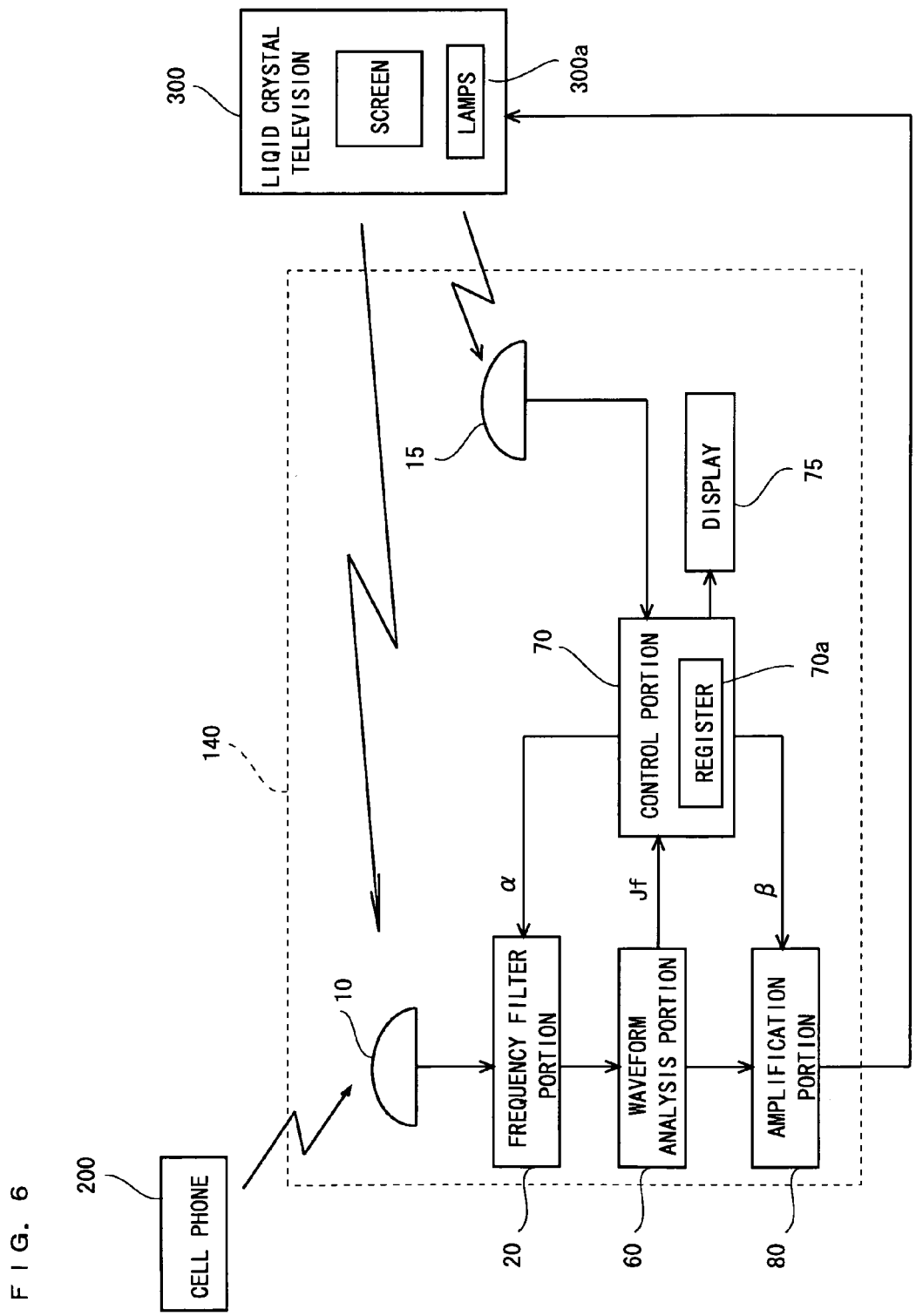
FIG. 6 is a block diagram illustrating the overall configuration of a reception system including an infrared communications receiver according to a second embodiment.

A second embodiment will be described. FIG. 6 is a block diagram illustrating the overall configuration of a reception system including an infrared communications receiver 140 according to the second embodiment. When comparing the configuration of the receiver 140 included in FIG. 6 with the configuration of the receiver 100 included in FIG. 1, there are differences from the receiver 100 in that a waveform analysis portion 60 is provided between the frequency filter portion 20 and the amplification portion 80, in place of the strength information generation portion 30 and the subtraction portion 50, and a control portion 70 and a display 75 are provided between the waveform analysis portion 60 and the lamp light-receiving element 15, in place of the frequency filter portion 25 and the multiplication factor adjustment portion 40. Here, elements corresponding to those in FIG. 1 are denoted by the same reference characters, and any descriptions other than those regarding the different elements will be omitted.

The control portion 70 is required to determine whether the lamps 300a are being driven by PWM drive or by continuous drive. The determination is made in the following manner.

When the lamps 300a are driven by continuous drive, their waveforms are 1-MHz frequency sinusoidal waves as shown in FIG. 2(A). On the other hand, when the lamps 300a are driven by PWM drive, an oscillator that oscillates with a 1-MHz sinusoidal wave is repeatedly turned ON/OFF at 100 kHz.

Accordingly, in order to have a predetermined time constant between entry of the near-infrared light and output of the noise, for example, indotricarbocyanine or Alexa Fluor® available from Molecular Probes is applied to the surface of the lamp light-receiving element 15. Alternatively, a filter having a similar function may be provided between the lamp light-receiving element 15 and the control portion 70.

As a result, in the case of continuous drive, conversion into a direct-current signal as indicated by the dotted lines in FIG. 2(A) is performed, while in the case of PWM drive, conversion into a square wave signal with a predetermined duty cycle as indicated by the dotted lines in FIG. 2(B) is performed. Note that when the lamp light-receiving element 15 is provided with an optical filter for cutting off visible light, the lamp light-receiving element 15 converts the near-infrared light into the direct-current signal or the square wave signal. Also, when no optical filter for cutting off visible light is provided, the lamp light-receiving element 15 converts at least one of the near-infrared light and the visible light into the direct-current signal or the square wave signal.

Then, the control portion 70 samples an output from the lamp light-receiving element 15 a plurality of times in predetermined cycles. As a result, the control portion 70 determines the drive mode to be continuous drive when obtained values are only high-level values, while determining the mode to be PWM drive when obtained values are high- and low-level values. When the determination indicates continuous drive, the control portion 70 sets continuous drive threshold $\alpha 0$ and gain $\beta 0$ as shown in FIG. 7 for the frequency filter portion 20 and the amplification portion 80, respectively. Continuous noise as generated in the case of continuous drive is reduced by the frequency filter portion 20 to a sufficiently low level, and therefore threshold $\alpha 0$ and gain $\beta 0$ may be of low values.

On the other hand, when the determination indicates PWM drive, the control portion 70 sets PWM drive threshold $\alpha 1$ and gain $\beta 1$ as shown in FIG. 7 for the frequency filter portion 20 and the amplification portion 80, respectively. Unlike continuous drive threshold $\alpha 0$ and gain $\beta 0$, there are a plurality of sets of PWM drive thresholds and gains, the lowest threshold $\alpha 1$ and gain $\beta 1$ are initially set for the frequency filter portion 20 and the amplification portion 80, respectively.

Then, when no infrared light for infrared communications is transmitted from the cell phone 200, the receiver 140 receives near-infrared light emitted by the lamps 300a at the data light-receiving element 10, and outputs non-abrupt noise and abrupt noise. Once the non-abrupt noise and the abrupt noises are provided to the frequency filter portion 20, the non-abrupt noise is substantially reduced and the abrupt noise passes through the frequency filter portion 20 approximately once every one thousand to ten thousand times, as described in the first embodiment. The abrupt noise that has passed through the frequency filter portion 20 is provided to the waveform analysis portion 60. The waveform analysis portion 60 counts the number of times the abrupt noise is provided, thereby detecting an occurrence frequency Jf, and provides the detected occurrence frequency Jf to the control portion 70.

The control portion 70 compares the provided occurrence frequency Jf for the abrupt noise with a preset upper tolerance, and when the occurrence frequency Jf is higher than the upper tolerance, the threshold for the frequency filter portion 20 is determined to be changed, and the threshold is set again. In this manner, the control portion 70 repeatedly sets the threshold until the occurrence frequency Jf for the abrupt noise is lower than the upper tolerance, and when the occurrence frequency Jf is set to be lower than the upper tolerance, the display 75 indicates that infrared communications are available. Note that the upper tolerance is determined considering the relationship with the time required for transferring image data from the cell phone 200 to the receiver 100.

Upon notification by the display 75 indicating that infrared communications are available, the viewer operates the cell phone 200 to transmit image data to the receiver 140 via 40-kHz frequency infrared.

FIG. 7 is a diagram illustrating combinations of threshold for the frequency filter portion 20 and gain for the amplification portion 80 for both cases where the lamps 300a are being driven by continuous drive and where the lamps 300a are being driven by PWM drive, and these combinations are prestored in a register 70a provided in the control portion 70. Since the non-abrupt noise generated during continuous drive is reduced to a sufficiently low level by the frequency filter portion 20, a set of threshold $\alpha 0$ and gain $\beta 0$ is prepared.

On the other hand, in order to reduce the abrupt noise generated during PWM drive, it is necessary to detect an occurrence frequency Jf for the abrupt noise, and change the threshold for the frequency filter portion 20 in accordance with the detected occurrence frequency Jf. Accordingly, there are prepared n combinations $(\alpha 1, \beta 1)$ to $(\alpha n, \beta n)$ of threshold and gain as shown in FIG. 7.

The combinations are arranged in order from the lowest threshold $\alpha 1$ $(\alpha 1 > \alpha 0)$ to the highest threshold $\alpha n$. In the frequency filter portion 20, threshold $\alpha 1$ is initially set, and the threshold is sequentially set to be higher as the occurrence frequency Jf for the abrupt noise increases. Similarly, gains are also arranged in order from the lowest $\beta 1$ $(\beta 1 > \beta 0)$ to the highest $\beta n$.

By setting a higher threshold for the frequency filter portion 20, noise levels of frequencies close to the center frequency can be reduced, but simultaneously, the amplitude of a data signal to be passed decreases. Therefore, in order to change the amplitude of the data signal back to its initial value after the abrupt noise is reduced, it is necessary to increase the gain for the amplification portion 80 as well in accordance with the threshold.

Accordingly, the thresholds prepared for PWM drive range from about medium to high values. Correspondingly, the gains prepared also range from about medium to high values. Note that when the lamp light-receiving element 15 is provided with no optical filter for cutting off visible light, the control portion 70 determines whether the lamps 300a are being driven by continuous drive or by PWM drive based on visible light and infrared light.

2.2 Operations of the Control Portion

Figure 8:
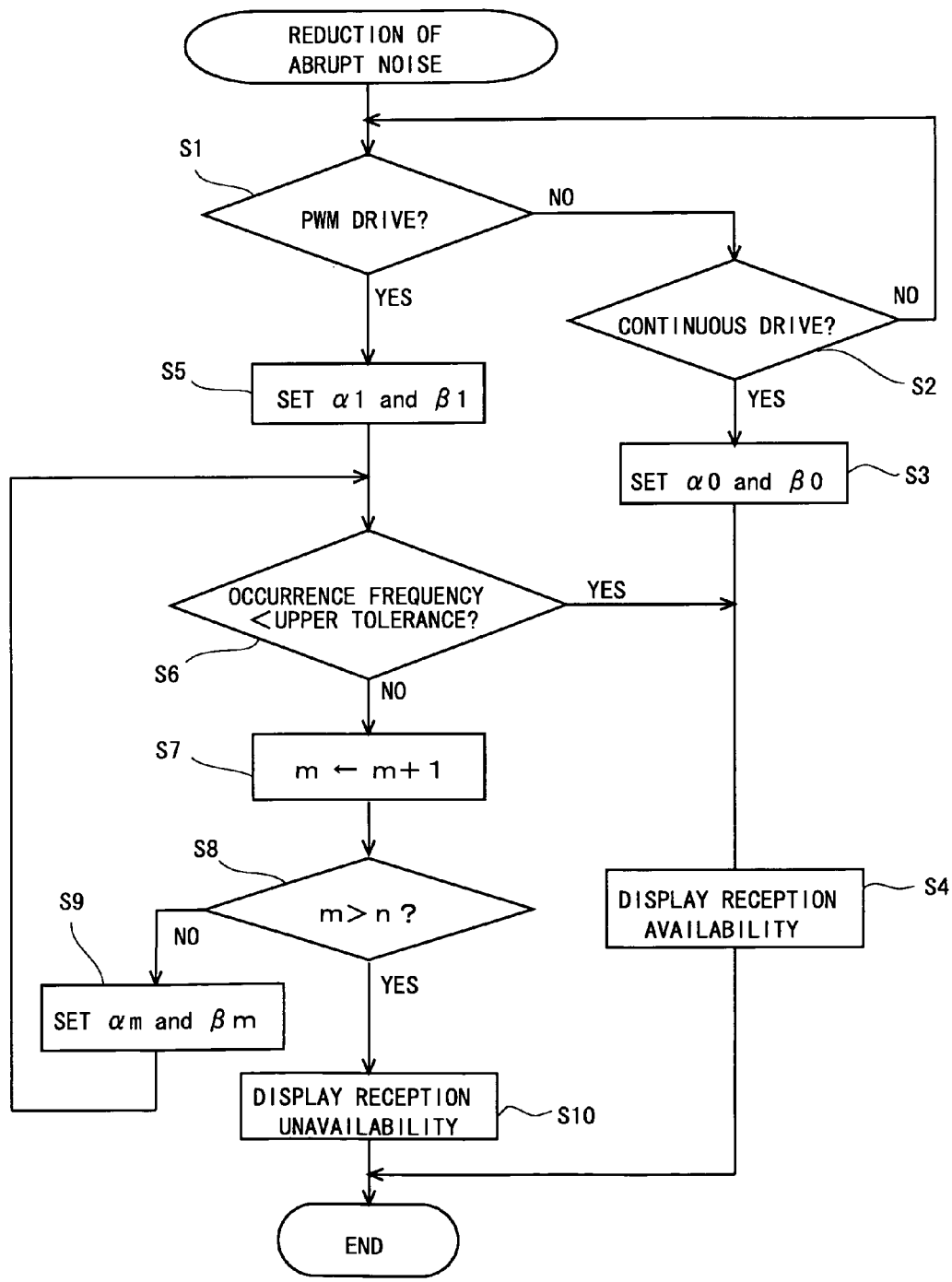
FIG. 8 is a flowchart illustrating the operation of a control portion for sufficiently reducing the abrupt noise level in the receiver of the embodiment.

FIG. 8 is a flowchart illustrating the operation of the control portion 70 for sufficiently reducing the abrupt noise level in the receiver 140 of the second embodiment. The operation of the control portion 70 to be described with reference to FIG. 8 is to set a threshold and a gain required for sufficiently reducing the level of the abrupt noise included in a data signal.

First, in step S1, whether or not the lamps 300a are being driven by PWM drive is determined based on near-infrared light received by the lamp light-receiving element 15. When the result is negative, a determination is made in step S2, regarding whether or not the lamps 300a are being driven by continuous drive. When the determination result in step S2 is negative, the lamps 300a are being driven neither by continuous drive nor by PWM drive, and therefore control returns to step S1.

On the other hand, when the determination result in step S2 is affirmative, the lamps 300a are being driven by continuous drive, and therefore included noise is simply non-abrupt. Accordingly, in step S3, continuous drive threshold $\alpha 0$ and gain $\beta 0$ shown in FIG. 7 are set for the frequency filter portion 20 and the amplification portion 80, respectively. As a result, the non-abrupt noise is reduced to a sufficiently low level by the frequency filter portion 20. Then, control proceeds to step S4, where the message "infrared communications available" is displayed on the display 75, whereby the setting of the threshold and the gain ends.

On the other hand, when the determination is affirmative in step S1, i.e., when the lamps 300a are determined as being driven by PWM drive, the lowest threshold and gain shown in FIG. 7, threshold $\alpha 1$ and gain $\beta 1$, are set in step S5 for the frequency filter portion 20 and the amplification portion 80, respectively.

Next, in step S6, a determination is made regarding whether or not the occurrence frequency Jf for the abrupt noise detected by the waveform analysis portion 60 poses a problem in receiving infrared from the cell phone 200, i.e., whether or not the occurrence frequency is lower than a preset upper tolerance.

When the determination result in step S6 is affirmative, i.e., when the occurrence frequency Jf for the abrupt noise is lower than the upper tolerance, control proceeds to step S4.

On the other hand, when the determination result in step S6 is negative, the occurrence frequency Jf for the abrupt noise is therefore higher than the upper tolerance, variable "m" is incremented by 1 in step S7, and a determination is made in step S8, regarding whether or not the incremented variable "m" is higher than "n", which indicates the number of combinations of threshold and gain.

When the determination result in step S8 is negative, the threshold for the frequency filter portion 20 and the gain for the amplification portion 80 are set by selecting a combination ($\alpha$m, $\beta$m) corresponding to the variable "m" from among the combinations ($\alpha 1$, $\beta 1$) to ($\alpha$n, $\beta$n) shown in FIG. 7, and control returns to step S6.

On the other hand, when the determination result in step S8 is affirmative, the prepared thresholds do not allow the abrupt noise to be sufficiently reduced, and the message "infrared communications not available" is displayed on the display 75 in step S10, whereby the setting of the threshold and the gain ends.

2.3 Effect

The control portion 70 sequentially increases the threshold for the frequency filter portion 20 based on the occurrence frequency Jf for the abrupt noise provided by the waveform analysis portion 60 until a data signal can be received from the cell phone 200. As a result, abrupt noise derived from the lamps 300a of the liquid crystal television 300 can be reduced to a sufficiently low level without reducing the strength of the data signal. At this time, the non-abrupt noise level can also be reduced at the same time.

Furthermore, during PWM drive, the control portion 70 sequentially selects and sets the threshold for the frequency filter portion 20 in order from the lowest threshold $\alpha 1$ among the combinations shown in FIG. 7, and confirms the effect of the threshold upon each setting. As a result, the abrupt noise is reduced using the lowest threshold of the required size, and therefore any adverse influence on the data signal can be minimized. Also, when the threshold is selected, a gain corresponding thereto is simultaneously selected, and therefore the amplitude of the data signal, which has been reduced by the frequency filter portion 20, can be recovered.

2.4 Variant

Figure 9:
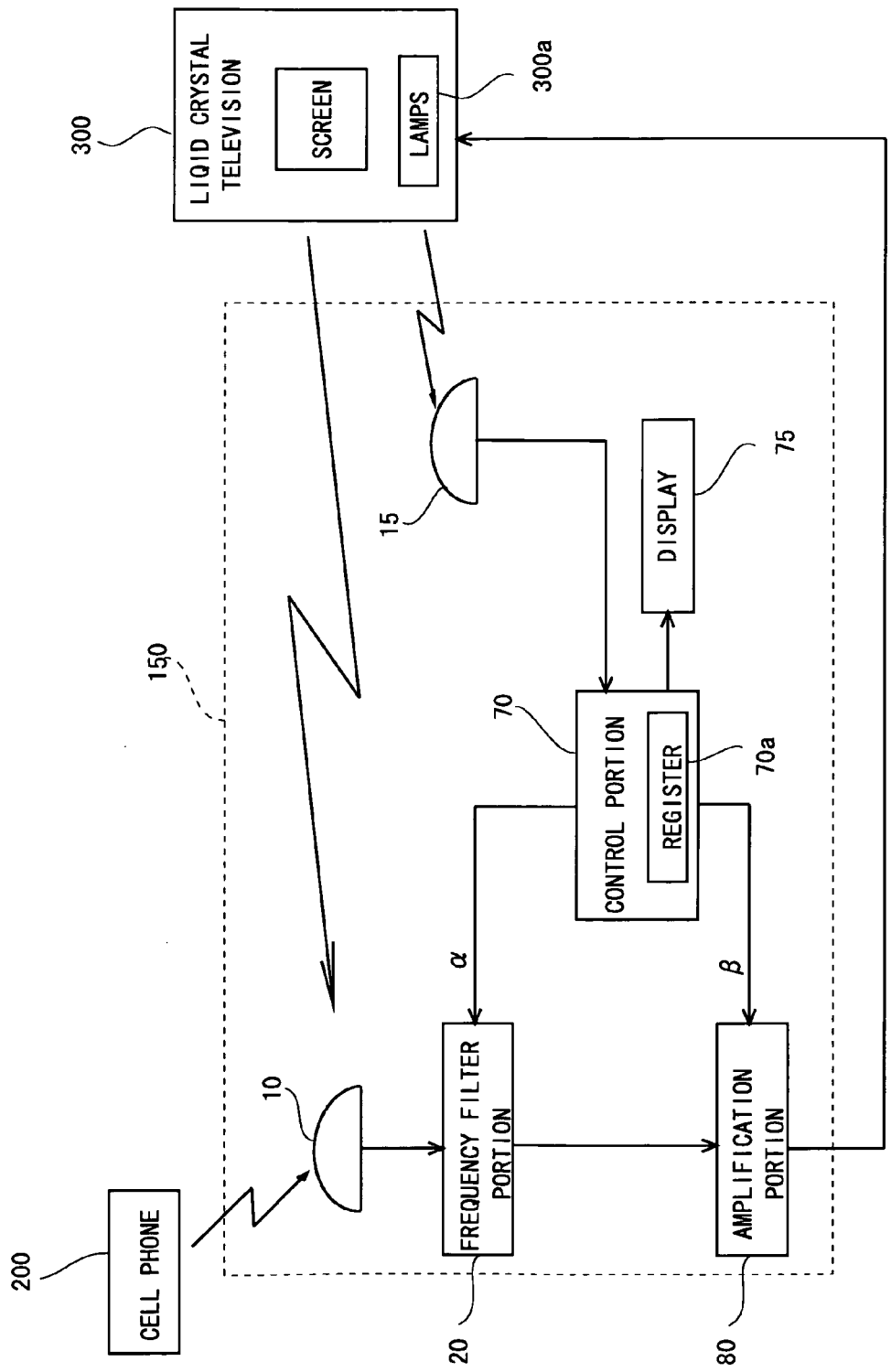
FIG. 9 is a block diagram illustrating the overall configuration of a reception system including an infrared communications receiver according to a variant of the embodiment.

A variant of the second embodiment will be described. FIG. 9 is a block diagram illustrating the overall configuration of a reception system including an infrared communications receiver 150 according to the variant. In FIG. 9, elements corresponding to those in FIG. 6 are denoted by the same reference characters, and any descriptions thereof will be omitted. In this variant, unlike in the second embodiment, the waveform analysis portion 60 is not provided, as shown in FIG. 9. Also, FIG. 10 is a diagram illustrating combinations of threshold for the frequency filter portion 20 and gain for the amplification portion 80 in the variant for both cases where the lamps 300a are being driven by continuous drive and where the lamps 300a are being driven by PWM drive. FIG. 10 shows a combination of threshold and gain for each of the cases of continuous drive and PWM drive.

The control portion 70 determines whether the lamps 300a are being driven by continuous drive or by PWM drive based on near-infrared light received by the lamp light-receiving element 15, as described in the second embodiment. In the case of continuous drive, continuous drive threshold $\alpha 0$ and gain $\beta 0$ shown in FIG. 10 are set for the frequency filter portion 20 and the amplification portion 80, respectively, while in the case of PWM drive, PWM drive threshold $\alpha$k ($\alpha$k>$\alpha 0$) and gain $\beta$k ($\beta$k>$\beta 0$) shown in FIG. 10 are set for the frequency filter portion 20 and the amplification portion 80, respectively.

Note that unlike in the receiver 140 of the second embodiment, the waveform analysis portion 60 is not provided, and therefore it is not possible to determine whether or not threshold $\alpha$k and gain $\beta$k set for PWM drive are appropriate, i.e., whether or not the occurrence frequency Jf for the abrupt noise is lower than the upper tolerance. Also, the control portion 70 cannot automatically set threshold $\alpha$k and gain $\beta$k again in accordance with the occurrence frequency Jf for the abrupt noise. Note that when the lamp light-receiving element 15 is provided with no optical filter for cutting off visible light, the control portion 70 determines whether the lamps 300a are being driven by continuous drive or by PWM drive based on visible light and infrared light.

Figure 11:
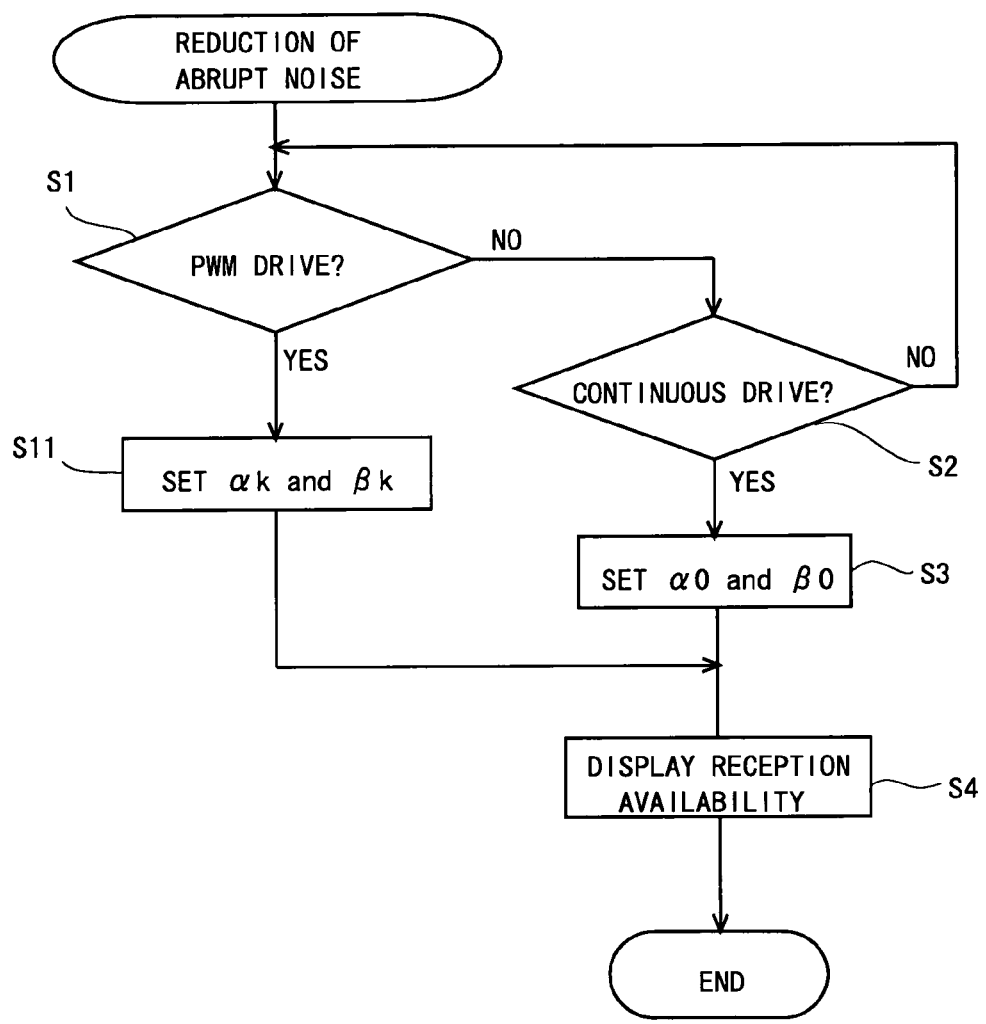
FIG. 11 is a flowchart illustrating the operation of a control portion for reducing the abrupt noise level in the variant of the embodiment.

FIG. 11 is a flowchart illustrating the operation of the control portion 70 for setting the threshold and gain required for reducing the abrupt noise level in the variant of the second embodiment. The operation of the control portion 70 to be described with reference to FIG. 11 is to reduce the level of the abrupt noise included in a data signal. Note that the same steps as those shown in FIG. 8 are denoted by the same reference characters.

Initially, in step S1, whether or not the lamps 300a are being driven by PWM drive is determined based on near-infrared light received by the lamp light-receiving element 15, and when the determination result is negative, a determination is made in step S2, regarding whether the lamps are being driven by continuous drive. When the determination result in step S2 is negative, the lamps 300a are being driven neither by continuous drive nor by PWM drive, and therefore control returns to step S1.

On the other hand, when the determination result in step S2 is affirmative, the lamps 300a are being driven by continuous drive, and therefore included noise is simply non-abrupt. Accordingly, in step S3, continuous drive threshold $\alpha 0$ and gain $\beta 0$ shown in FIG. 10 are set for the frequency filter portion 20 and the amplification portion 80, respectively. As a result, the non-abrupt noise is reduced to a sufficiently low level by the frequency filter portion 20. Then, control proceeds to step S4, and the message "infrared communications available" is displayed on the display 75, whereby the setting of the threshold and the gain ends.

On the other hand, when the determination in step S1 is affirmative, i.e., when the lamps 300a are determined as being driven by PWM drive, PWM drive threshold $\alpha$k and gain $\beta$k are set in step S11 for the frequency filter portion 20 and the amplification portion 80, respectively. Then, the message "infrared communications available" is displayed on the display 75 in step S4, whereby the setting of the threshold and the gain ends.

Since the waveform analysis portion 60 is not provided and the register 70a has stored therein a small number of combinations of threshold and gain, the configuration of the receiver 150 is simpler than the receiver 140 of the second embodiment. Thus, production can be readily achieved at low cost.

3. Others

While the cell phone 200 has been described in each of the above embodiments as an example of the electronic equipment for transmitting data to the receivers 100 to 150, the electronic equipment is not limited to the cell phone 200 and can be, for example, a digital camera or a video camera so long as the data can be transmitted via infrared communications.

Also, while the liquid crystal television 300 has been described as an example of the display device for displaying data received by the receivers 100 to 150, the display device is not limited to the liquid crystal television 300 and can be any display device including a light source for generating infrared.

Also, while the above embodiments have been described with respect to the case where the receivers 100 to 150 are intended for IrSS in unilateral infrared communications, the receivers are not limited to this and may be capable of bi-directional infrared communications.

INDUSTRIAL APPLICABILITY

The present invention is applicable to infrared communications receivers provided in display devices including light sources for displaying data, such as video, on the display devices via infrared communications, and is especially suitable for infrared communications receivers provided in liquid crystal display devices including backlight light sources.

The invention claimed is:

1. An infrared communications receiver configured to be used with a display device including a light source, the receiver comprising:
    a first light-receiving element configured to receive an externally transmitted infrared signal and output a first signal;
    a second light-receiving element disposed in the vicinity of the light source configured to at least receive infrared light or visible light emitted by the light source and output a second signal; and
    a reduction portion configured to reduce a noise component in the first signal based on the second signal, the noise component being derived from the infrared light emitted by the light source, the reduction portion including,
        a frequency filter portion configured to reduce the noise component,
        a determination portion configured to receive a drive control signal including control information for driving the light source, and determine whether or not the light source is being driven by pulse width modulation drive based on the drive control signal, and
        a control portion configured to set a threshold for the frequency filter portion when the light source is determined as being driven by pulse width modulation drive by the determination portion, wherein
    when the light source is determined as being driven by pulse width modulation drive by the determination portion, the frequency filter portion reduces an abrupt noise element in a data signal based on the threshold being set, the abrupt noise element being derived from the infrared light emitted by the light source.

2. The infrared communications receiver according to claim 1, wherein,
    the reduction portion further includes a detection portion configured to detect an occurrence frequency by counting the number of times the abrupt noise element is output by the frequency filter portion, and
    the control portion changes the threshold upon determination that the first signal is unreceivable based on the occurrence frequency for the counted abrupt noise elements.

3. The infrared communications receiver according to claim 1, wherein,
    the reduction portion further includes an amplification portion configured to amplify the first signal with the reduced abrupt and non-abrupt noise elements,
    the control portion sets a gain corresponding to the threshold for the amplification portion, and
    the amplification portion amplifies the first signal based on the gain being set.

4. The infrared communications receiver according to claim 3, wherein,
    the control portion further contains data for a plurality of preset combinations of the threshold and the gain, and
    the control portion selects one of the combinations in the data based on an occurrence frequency for the noise component, and sets the selected threshold for the frequency filter portion and the selected gain for the amplification portion.

5. The infrared communications receiver according to claim 1, wherein the second light-receiving element has applied on its surface a substance configured to convert at least a portion of the second signal into a direct-current signal.

* * * * *

UNITED STATES PATENT AND TRADEMARK OFFICE
CERTIFICATE OF CORRECTION

| | | |
|---|---|---|
| PATENT NO. | : 8,417,127 B2 | Page 1 of 1 |
| APPLICATION NO. | : 12/452753 | |
| DATED | : April 9, 2013 | |
| INVENTOR(S) | : Keiji Hayashi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 473 days.

Signed and Sealed this
Twenty-ninth Day of October, 2013

Teresa Stanek Rea
*Deputy Director of the United States Patent and Trademark Office*